United States Patent [19]

Hoffmann

[11] Patent Number: 4,911,842
[45] Date of Patent: Mar. 27, 1990

[54] WOUND FILTER MODULE

[75] Inventor: Jürgen Hoffmann, Hardegsen-Ellierode, Fed. Rep. of Germany

[73] Assignee: Sartorius GmbH, Fed. Rep. of Germany

[21] Appl. No.: 256,627

[22] Filed: Oct. 12, 1988

[30] Foreign Application Priority Data

Nov. 27, 1987 [DE] Fed. Rep. of Germany ....... 3740249

[51] Int. Cl.$^4$ .............................................. B01D 29/26
[52] U.S. Cl. .................................. 210/489; 210/497.1; 55/498
[58] Field of Search ................. 55/158, 486, 489, 520, 55/498, 500; 210/321.83, 487, 489, 494.1, 497.01, 497.1, 497.2, 321.74

[56] References Cited

U.S. PATENT DOCUMENTS

| | | | |
|---|---|---|---|
| 3,268,442 | 8/1966 | Pall et al. | 210/702 |
| 3,417,870 | 12/1968 | Bray | 210/321.83 |
| 3,668,837 | 6/1972 | Gross | 210/321.83 |
| 3,813,334 | 5/1974 | Bray | 210/321.83 |
| 3,933,557 | 1/1976 | Pall | 156/174 |
| 4,032,688 | 6/1977 | Pall | 210/497.1 |
| 4,083,780 | 4/1978 | Call | 210/321.83 |
| 4,128,479 | 12/1978 | Malchesky et al. | 210/497.1 |
| 4,235,723 | 11/1980 | Bartlett, Jr. | 210/321.83 |
| 4,479,874 | 10/1984 | Rosenberg et al. | 210/445 |
| 4,548,714 | 10/1985 | Kirwan, Jr. et al. | 210/232 |

FOREIGN PATENT DOCUMENTS

| | | |
|---|---|---|
| 62867 | 10/1982 | European Pat. Off. . |
| 2462882 | 5/1981 | Fed. Rep. of Germany . |
| 281124 | 12/1927 | United Kingdom . |
| 267485 | 4/1928 | United Kingdom . |
| 284982 | 5/1929 | United Kingdom . |
| 486602 | 6/1938 | United Kingdom . |
| 585295 | 2/1947 | United Kingdom . |
| 619626 | 3/1949 | United Kingdom . |
| 817440 | 7/1959 | United Kingdom . |

*Primary Examiner*—Peter A. Hruskoci
*Assistant Examiner*—Wanda L. Millard
*Attorney, Agent, or Firm*—Eric P. Schellin

[57] ABSTRACT

In a wound filter module with an areal or flat filter band with draining support and spacing band wound around a draining means, central hollow core (K), whose longitudinal edges are enclosed in a wound state in a sealing element (4,6,4',6'), the filter band and the spacing band (1,3) are connected, resting on one another in a coinciding manner, by their two ends to a closed, that is, endless band (B1, B2, B3, B4, Bn) which encloses a central hollow core (K) or a filter core (KB1; KB1,B2;KB1,B2,B3) with its inner side and which is wound around the latter in a spiral manner. Every further, closed filter band with spacing band encloses the particular filter element (K, B1) previously formed and is wound around the latter. The fluid to be filtered and also the filtrate obtained from the individual layers can penetrate both transversally as well as tangentially in the direction of the individual spiral windings (B1 to Bn) to the hollow core (K). The filter module can be better adapted in their design to the very different requirements by virtue of this winding principle.

4 Claims, 3 Drawing Sheets

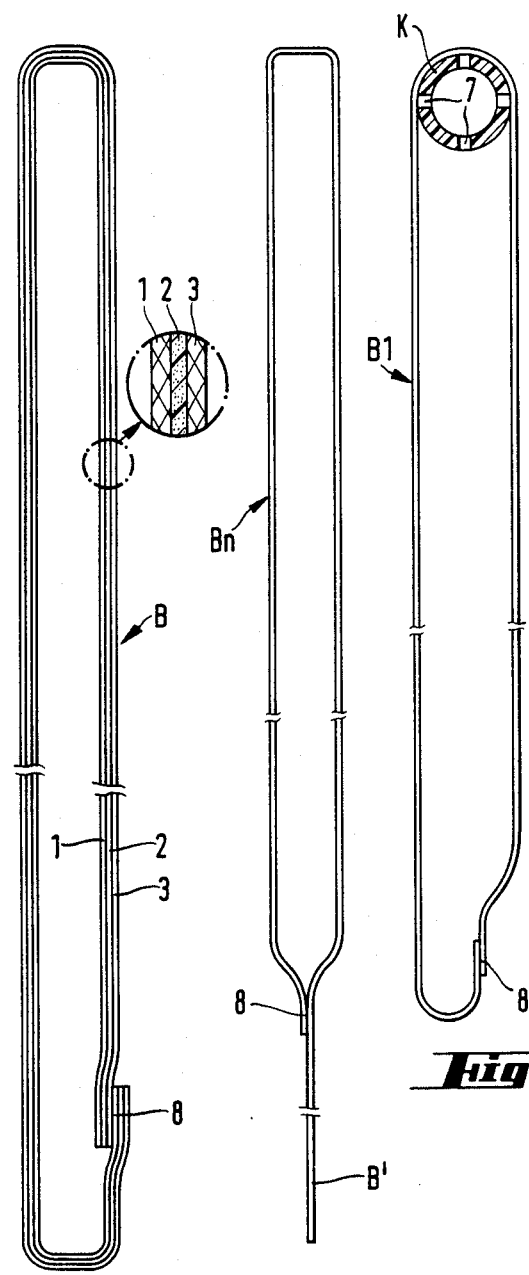
Fig. 1
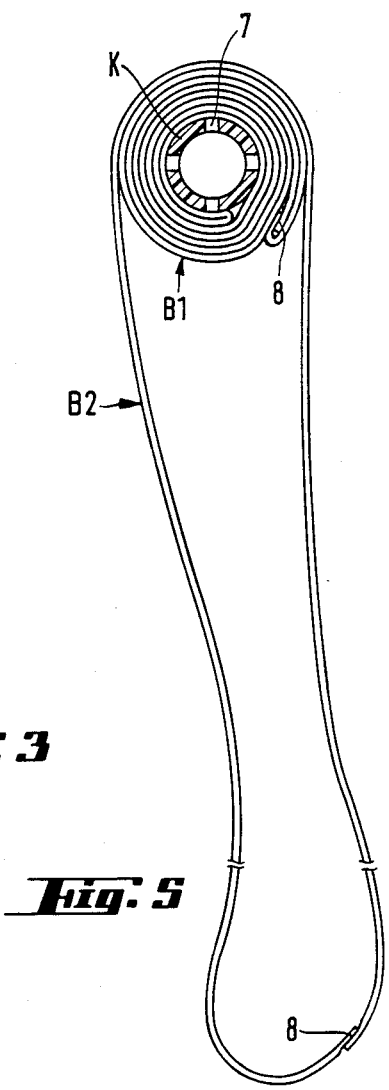
Fig. 2
Fig. 3
Fig. 4
Fig. 5

WOUND FILTER MODULE

BACKGROUND OF THE INVENTION

The invention relates to a wound filter module with a flat filter band having a draining support and spacing band wound [i.e. the filter band] around a draining, central hollow core, whose longitudinal edges are enclosed in a wound state in a sealing element as is known e.g. according to the state of the art in U.S. Pat. No. 2,647,637. In this known wound module, both front surfaces are closed by end cap and the fluid to be filtered is distributed within the spiral in a spiral direction and the draining support layer empties in the hollow central core A filter element according to DE-GM 80 26 874; U.S. Pat. No. 3,367,504 and DE-AS 24 62 282 is similarly designed.

Wound modules are also known (U.S. Pat. No. 3,801,400) in which, instead of a flat filter band, threads of a greater or lesser thickness are wound in bobbin-like fashion around a hollow core and those threads are optionally interlaced [cross-linked] with each other by thermal action and act over the entire layer thickness as a deep filter. However, this design is too inflexible for solving the varied filtration problems in the many types of industries and in the filtration of the many different types of fluids (gas and/or liquid) and can not be readily optimized for solving these problems.

On the one hand, such wound modules have the advantage over filter elements with a folded design with pleating arranged around a cylindrical hollow core that a large deep action is present, conditioned by the thickness of the filter-active wound cylinder, which action results e.g. in a desired design of an automatically filter-active filter cake and in higher contact times.

On the other hand, traditional wound modules have the disadvantage in comparison to filter elements with folded design of a considerably smaller freely accessible surface and therewith of an effectively filter-active surface.

The invention therefore has the problem of creating a wound filter module with simple means which can be better adapted as a result of its design to the many different requirements of the filtration art, especially as regards the possibility of variation, action as deep filter and freely accessible effective filter surface and the combination of specific filter layers.

The invention solves this problem in that the filter band and the spacing band are connected, resting on one another in a coinciding manner, by their two ends to an endless band which encloses a central hollow core or a filter core with its inner side and which is wound around the latter in a spiral manner.

Every further endless filter band with spacing band encloses the particular previously-formed filter band and is wound around the latter. In this manner, very different types of filter materials can be optimally arranged within a total filter element and the surfaces coordinated with each other in order to be able to achieve a optimum total design for the many different types of filtration problems. By virtue of this special design, the flow can pass through the filter element both transversally and also tangentially, i.e. in a spiral direction. This makes it possible, especially in the beverage industry, to handle large amounts of fluid and to achieve long dwell times.

BRIEF DESCRIPTION OF THE DRAWINGS

The concept of the invention will now be explained in more detail in an embodiment with reference made to the enclosed drawings.

FIG. 1 shows a schematic section of an endless band designed in three layers.

FIG. 2 shows an endless band in schematic fashion with a band continuation which is not closed.

FIG. 3 shows a first band placed around a core.

FIG. 4 shows the winding formed therefrom.

FIG. 5 shows a further band which encloses the previous winding.

DETAILED DESCRIPTION OF THE INVENTION

Figure 6:
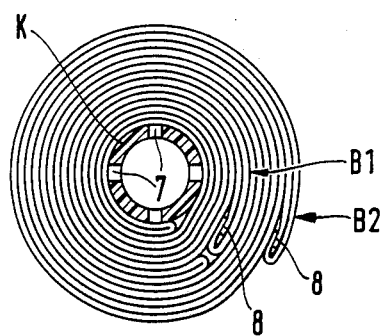
FIG. 6 shows the filter element produced with the second band.

The band B designed in three layers according to FIG. 1 consists of a first layer 1 e.g. in the form of a drainage fleece, a second layer 2 e.g. in the form of a microporous membrane, a filter-active fleece and a third layer 3 in the form of a prefilter with draining properties e.g. in the form of a fleece. These layers 1-3, which rest on each other in a coinciding manner, are connected to a closed, that is, endless band B at the ends by means of ultrasonic welding, thermal welding or by adhesion. Bands B1 and Bn are designed correspondingly.

According to FIG. 2, band Bn is additionally connected at connection point 8 to band section b', which projects outward and is a multiple, as regards its length, of the circumference of the filter element produced by the last winding Bn and which secures as winding the filter element against fluid backwash from hollow core K. The end of this band B' can be fixed by customary connection means to the outer winding. Support and spacing bands 1,3 can also be formed by plastic grids or fabrics with a greater or lesser fine mesh. The design of individual layers 1-3 or of further layers depends on the fluids to be filtered and the band length depends on the areas to be produced and the achieving of certain dwell times.

Figure 7:
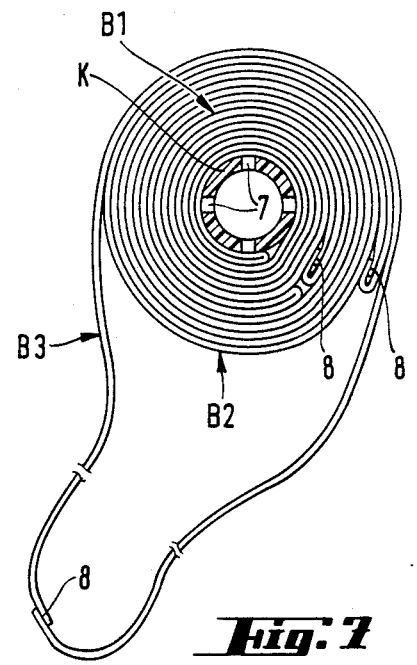
FIG. 7 shows a third band which encloses the previously produced filter element.
Figure 8:
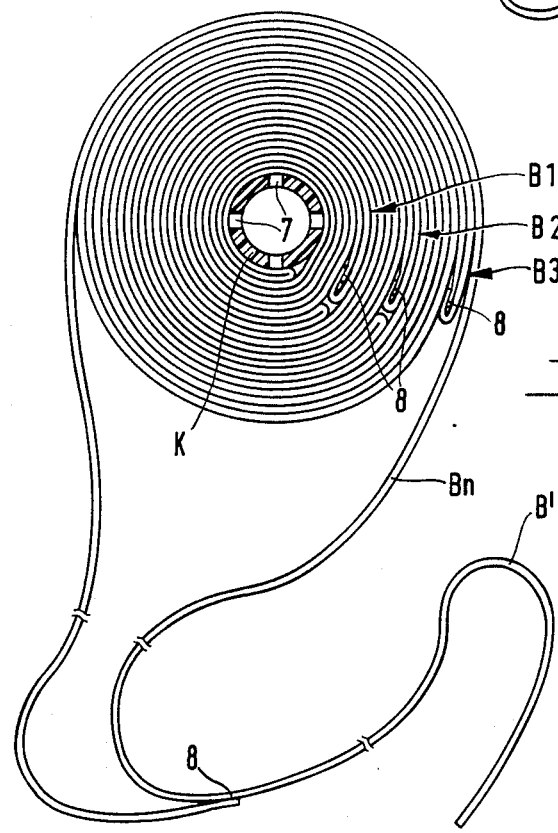
FIG. 8 shows a section through a filter element with a last endless band and formed-on, non-closed band.

According to FIG. 3, central hollow core K, which exhibits perforations 7 for the removal of fluid, is first enclosed by band B1 and wound in a spiral manner according to FIG. 4. The filter element produced in this manner as a blank can be wound in accordance with FIG. 5 by a further band B2 as described above so that a filter element of two bands B1, B2 is created in accordance with FIG. 6 with preselected filtration properties. In the same manner, a further band B3 can supplement the layered construction of the filter element in accordance with FIG. 7 and be completed by a band Bn in accordance with FIG. 8, in which instance band B' projecting outward via connection point 8 of band Bn functions by means of winding around the completed filter element as backwash protection.

Figure 9:
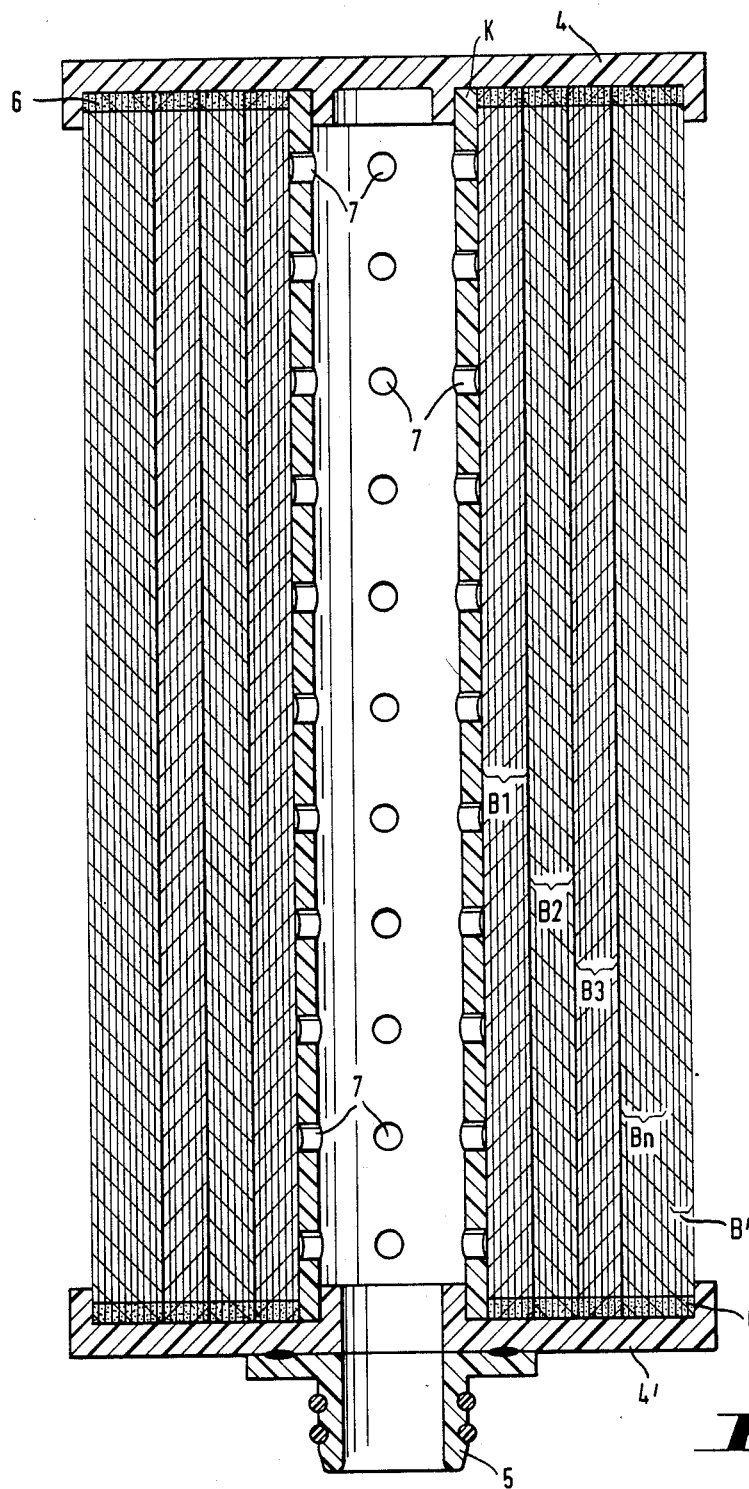
FIG. 9 shows a longitudinal section through a finished wound filter module for connection in a housing.

The wound filter module designed in this manner around hollow core K consisting of several bands B1 to Bn in accordance with FIG. 9 is provided for possible adaptation in a surrounding housing with end caps 4,4'.

At least one end cap 4' comprises a connection adapter 5 for supplying and emptying hollow core K.

The filter element can be loaded with and emptied of fluid both from the inside toward the outside and also from the outside toward the inside. The two end caps 4,4' are connected in a leakproof manner to the front surfaces of the filter winding, e.g. by melting integration (connection point 6) or with a flowable plastic mass 6 so that fluid can only penetrate, as determined, through the individual filter layers 2 and drainage layers 1,3. The fluid to be filtered and also the filtrate obtained from the individual layers can penetrate both transversally as well as tangentially in the direction of the individual spiral windings to hollow core K. tangential flow path, e.g. in the case of a partial blockage of the filter layers, avoiding a transversal direction.

The design of the invention has the great advantage that the separating characteristics can be adapted to very different types of operating conditions in a manner suitable for practice.

The principle is of course also suitable for n-cornered hollow cores K.

If the filter element is to be operated from the inside toward the outside, then the backwash protection can also be designed in the form of a plastic grid for rather large pressure loads.

What is claimed is:

1. A filter device comprising an elongated perforated hollow core having open oppositely disposed ends, at least a first endless loop of a band of a filter web having a transverse dimension substantially similar to the said core, said core being positioned in said endless loop and said endless loop being wound spirally about said core, a final endless loop of a band of a filter web having a transverse dimension substantially similar to the said core and having an elongated filter band extension, said core having said first endless loop wound thereabout being positioned in said final endless loop and said final endless loop being spirally wound about said wound core, said elongated filter band extension also being spirally wound about said wound core being wound with said final endless loop to thereby complete the filter device, cap means positioned at each said opposite end of said elongated hollow core, at least one of said caps having conduit means relatively centrally thereof whereby to provide access internally of said hollow core.

2. The filter device of claim 1 wherein there are a plurality of first endless loops of a band of filter material and each is wound successively about said core in like manner.

3. The filter device of claim 2 wherein each of the bands of filter material include laminates of filter material.

4. The filter device of claim 3 wherein the laminate includes a layer of a fleece, a layer of a microporous membrane.

* * * * *